United States Patent
Ameen et al.

Patent Number: 6,121,919
Date of Patent: Sep. 19, 2000

[54] METHOD AND APPARATUS FOR RANGE CORRECTION IN A RADAR SYSTEM

[75] Inventors: Yashwant K. Ameen, Poway; Patrick Anthony Ryan, Ramona; Thomas W. Gingell, San Diego, all of Calif.

[73] Assignee: Eaton-VORAD Technologies, L.L.C., San Diego, Calif.

[21] Appl. No.: 09/360,365

[22] Filed: Jul. 23, 1999

[51] Int. Cl.[7] ........................................... G01S 7/40
[52] U.S. Cl. ........................ 342/174; 342/70; 342/71
[58] Field of Search .......................... 342/70, 71, 72, 342/114, 115, 160, 162, 196, 173, 174

[56] References Cited

U.S. PATENT DOCUMENTS

| | | | |
|---|---|---|---|
| 3,745,571 | 7/1973 | Chwastyk et al. | 342/194 |
| 4,975,706 | 12/1990 | Shrader | 342/160 |
| 5,302,956 | 4/1994 | Asbury et al. | 342/70 |
| 5,402,129 | 3/1995 | Gellner et al. | 342/70 |
| 5,670,962 | 9/1997 | Henderson et al. | 342/70 |

*Primary Examiner*—John B. Sotomayor
*Attorney, Agent, or Firm*—Jaquez & Associates; Martin J. Jaquez, Esq.; Allen Y. Lee, Esq.

[57] ABSTRACT

A method and apparatus for calibrating range in a radar system. Due mainly to temperature changes in a radar system which cause frequency deviation error, range errors can be introduced into the radar system, thus adversely affecting the determination of the position of targets relative to the host platform. These range errors can be corrected by detecting and accurately estimating the frequency deviation error of a radar system. The present invention improves target position determination performance in a radar system by reducing errors introduced by the frequency deviation error. The present invention relies upon the observation that the Doppler range rate is largely unaffected by frequency deviation error, and thus, is approximately equal to the actual range rate. In accordance with a first range calibration technique of the present invention, the radar system measures the range, Doppler range rate, and azimuth angle of a target during at least two successive time instances. If the measured data is qualified the method corrects the range using a frequency deviation correction factor, K. A second calibration technique of the present invention relies upon both the observation that the Doppler range rate is largely unaffected by frequency deviations and the observation that certain target tracks provide more reliable data than other target tracks. Thus, tracks with more reliable data are given more weight in calibrating the range. The second calibration technique qualifies data, updates a frequency deviation correction factor, and corrects the range using the frequency deviation correction factor. The voltage bias implementation of the present method can be used with either the first or second calibration technique to calibrate the range. In the voltage bias implementation, the range is corrected by adjusting the voltage of the radar system's RF (radio frequency) source.

3 Claims, 9 Drawing Sheets

| TEMP (°C) | % CORRECTION | TEMP (°C) | % CORRECTION |
|---|---|---|---|
| -40 | 10 | 30 | 0 |
| -35 | 9 | 35 | 0 |
| -30 | 7 | 40 | 0 |
| -25 | 6 | 45 | 2 |
| -20 | 5 | 50 | 5 |
| -15 | 4 | 55 | 7 |
| -10 | 3 | 60 | 10 |
| -5 | 1 | 65 | 13 |
| 0 | 0 | 70 | 16 |
| 5 | 0 | 75 | 19 |
| 10 | 0 | 80 | 22 |
| 15 | 0 | 85 | 25 |
| 20 | 0 | 90 | 28 |
| 25 | 0 | 95 | 31 |

FIG. 9

METHOD AND APPARATUS FOR RANGE CORRECTION IN A RADAR SYSTEM

BACKGROUND OF THE INVENTION

1. Field of the Invention

This invention relates to radar systems, and more particularly to methods of range correction in radar systems.

2. Description of Related Art

Radio detecting and ranging, commonly referred to as "radar", is used for detecting and locating an object of interest, or "target", using the transmission, reflection, and reception of radio waves. Radar emits radio waves in a pattern emanating from the surface of the radar's antenna. Typically, radar systems are mounted to a platform such as a tower, airplane, ship, automobile or other motorized vehicle. The objective of these radar systems is to accurately locate the position of an object of interest or target relative to the radar's platform.

A number of radar techniques are well known in the art. Radar systems have been used to determine range, angular position, and range rate of objects of interest. Target range and angular position are determined by analyzing certain properties of the return radio wave signal. Target range rate is determined by taking advantage of the well-known Doppler effect. One distinguishing feature of radar systems is the type of modulation technique used to obtain range and range rate data. Examples of these different radar systems include unmodulated continuous wave (CW) radar, frequency modulated (FM) radar, pulse Doppler radar and frequency shift keying (FSK) radar. Other distinguishing features include differences in antenna types and in the approach used in extracting angular information about a target.

Radar locates a target's position by obtaining the target's "azimuth angle" and "range" relative to a reference line or a reference point of the radar antenna. A target's azimuth angle is defined as the angular distance between the antenna reference line and a line extending from the radar antenna to the target. A target's range is defined as the distance from the antenna reference point to the target. Thus defined, a target's azimuth angle and range yield a calculated target position. Many radar systems analyze frequency domain data from the return signal to calculate the azimuth angle and range of a target's position. However, the calculated range does not always correlate exactly with the actual range. Rather, due to ambient temperature variations, oscillator voltage fluctuations, and other well-known causes, errors will occur in calculated range.

Typically, the percent range error, defined as the percent difference between calculated range and actual range, is between 10% and 30%. Unless these errors are compensated for by the radar system, inaccuracies can result in the calculation of target positions relative to the radar system platform. Therefore, it is essential that range errors are accurately estimated and calibrated by the radar system to determine a target's position precisely.

Radar has been used in a wide variety of platforms to detect the position of objects. For example, radar has been mounted on "host" automobiles and other host vehicles to detect the position of objects (such as other vehicles) on a road. One such vehicular radar system is described in U.S. Pat. No. 5,302,956, issued on Apr. 12, 1994 to Asbury et al. and assigned to the owner of the present invention, which is hereby incorporated by reference for its teachings of vehicular radar systems. Another exemplary vehicular radar system using a "monopulse" azimuth radar for automotive vehicle tracking is described in U.S. Pat. No. 5,402,129, issued on Mar. 28, 1995 to Gellner et al. and assigned to the owner of the present invention, which is also hereby incorporated by reference for its teachings of vehicular radar systems. As described therein, object position data has been used in the prior art collision avoidance systems to brake or steer a host vehicle when the radar system detects a potential collision with another vehicle. Alternatively, the radar system may be used in an intelligent cruise control system to decelerate the host vehicle when the radar system detects a potential collision with another vehicle and accelerate the host vehicle when the collision danger terminates.

In both the prior art collision avoidance systems and the prior art intelligent cruise control systems, an accurate calculation of object position relative to the radar platform is critical for safe system performance. Disadvantageously, due to ambient temperature variations and oscillator voltage fluctuations, heretofore it has been difficult if not impossible to accurately estimate and calibrate the range error. Consequently, the prior art vehicular radar systems disadvantageously often introduced range errors when attempting to determine the position of targets and therefore introduced undesirable and sometimes dangerous inaccuracies into the collision avoidance process. Therefore, a need exists for a method and apparatus that can accurately estimate the range error and subsequently calibrate the calculated range.

To more fully describe the problems associated with range error, consider the exemplary collision avoidance vehicular radar system shown in FIGS. 1 and 2. As shown in FIGS. 1 and 2, a collision avoidance vehicular radar system 100 is mounted on a host vehicle 12. The host vehicle 12 is shown in FIGS. 1 and 2 traveling in a direction of travel 22 on a road 30. As described in U.S. Pat. No. 5,302,956, the radar system 100 cooperates with control systems (not shown) on the host vehicle 12 in a well-known manner to prevent the collision of the host vehicle 12 with other objects on the road 30. For example, as shown in FIGS. 1 and 2, the radar system 100 aids the host vehicle 12 in avoiding collision with other vehicles 40, 50 travelling in front of the host vehicle 12 in a direction substantially parallel to the direction of travel 22 of the host vehicle 12. As described below in more detail with reference to FIG. 8, and as disclosed in detail in U.S. Pat. No. 5,302,956, the radar system 100 preferably includes a radar antenna 10 and a microprocessor or micro-controller 11 (FIG. 8). The radar antenna 10 preferably is mounted to a front bumper 13 of the host vehicle 12 such that it points in a forward direction substantially parallel to the direction of travel 22 of the host vehicle 12. The microprocessor 11 in the radar system 100 calculates the position of objects detected by the radar antenna 10 in a well-known manner as exemplified by the monopulse azimuth radar system described in U.S. Pat. No. 5,402,129.

As shown in FIGS. 1 and 2, the radar antenna 10 includes an antenna reference line 20 that is defined by a line emanating from the center of antenna 10 and perpendicular to the surface of the radar antenna 10. The radar antenna 10 locates "target" vehicles (e.g., vehicles 40 and 50) in a well-known manner by transmitting a transmission signal (radar beam) having at least two known frequencies, $F_1$ and $F_2$. The frequencies are separated in the frequency spectrum by some pre-defined frequency range. For example, in one typical application, the transmit frequencies are separated by 300 kHz, although other frequency deviations may be used. The radar system senses the returned transmission signal that is reflected back from the target vehicles. Azimuth angle 19 is calculated relative to the antenna reference line 20. For example, in one exemplary radar system, wherein the radar system 100 comprises a monopulse azimuth radar system (such as that described in U.S. Pat. No. 5,402,129), the radar antenna 10 transmits a transmission signal and senses the returned transmission signal that is reflected back from the target vehicles in two physically separated locations of the radar antenna 10. The radar antenna 10 of a monopulse radar system is split into two antennas (10a, 10b) that are physically separated by a few centimeters. This separation of the receive antenna 10 provides a "stereo-vision" perspective to the radar system 100. By comparing selected properties of the reflected signals from the two receive antennas, the radar system 100 calculates azimuth angles to target vehicles in front of the host vehicle 12. The azimuth angles to the target vehicles are determined relative to the antenna reference line 20.

The radar system 100 determines the closing rate (velocity relative to the host vehicle 12) of a selected target vehicle in a well-known manner. For example, a target's closing rate is determined by analyzing the well-known "Doppler frequency shift" in the signal returned from the target.

The radar antenna 10 includes an antenna reference point 21 that is defined as a point at the center of antenna 10. Range is calculated relative to the antenna reference point 21. The radar system 100 determines the range of a selected target vehicle in a well-known manner. For example, in one embodiment, the transmission signals $F_1$ and $F_2$ are generated using a Frequency Shift Keying (FSK) modulation scheme. The transmission signal $F_1$ is defined as the carrier frequency and the transmission signal $F_2$ is equal to the carrier frequency plus a deviation frequency. In one typical application, $F_1$ is transmitted at 24.7250 GHz frequency whereas $F_2$ is transmitted at 24.7253 GHz. The difference of 300 kHz between $F_1$ and $F_2$ is called frequency deviation and it is the stability of this frequency deviation, which influences the radar range accuracy. The target range is proportional to the difference between the phases of returned $F_1$ and $F_2$ signals and is inversely proportional to the frequency deviation. Thus, any drift in the frequency deviation will result in range errors.

As shown in FIG. 2, the radar system 100 preferably determines the location of a target vehicle 40 relative to the radar antenna 10 by calculating both an azimuth angle 19 and a range value of the target vehicle 40. The azimuth angle 19 is defined as the angular distance from the antenna reference line 20 to a target line 24 formed from the antenna reference point 21 to the target vehicle 40. The actual range ("$R_a$") 16 to the target vehicle 40 is defined as the distance from the antenna reference point 21 to the target vehicle 40. Ideally, the radar system 100 transmits and receives the signal frequencies without any variation in frequency deviation $\Delta F$ (i.e., with a completely stable frequency deviation $\Delta F$). A variation in frequency deviation $\Delta F$ is referred to hereinafter as a "frequency deviance" (i.e., a variation in $F_1$–$F_2$ is referred to as a frequency deviation).

Thus, in an ideal radar system the frequency deviance should equal zero. When the frequency deviance is zero (as shown in FIG. 1), the calculated range ("$R_a$") 17 corresponds exactly to the actual range $R_a$ 16. However, due to ambient temperature variations, oscillator voltage fluctuations, and other causes, the frequency deviation $\Delta F$ often drifts from its nominal value (e.g., in the typical system described above, it drifts from a nominal value of 300 kHz). Consequently, the frequency deviance, or the variations in $\Delta F$, often drifts to become a non-zero number (i.e., variations in $\Delta F$ exist). When the frequency deviation $\Delta F$ drifts from its nominal value (of 300 kHz, for example), a range error 15 ("$R_e$") is introduced (see FIG. 2). The range error $R_e$ is defined as the difference between the calculated range $R_c$ 17 and the actual range $R_a$ 16 at a given time. For example, if the frequency deviation's nominal value is 300 kHz and has drifted to 400 kHz due to changes in ambient temperature or other factors, the range calculations would have a relative range error of +33%. An exemplary range error $R_e$ 15 caused by frequency deviance (i.e., a drift in frequency deviation from its nominal value) is shown graphically in FIG. 3 for a target moving away from the radar.

As shown in FIGS. 2 and 3, because of errors and variations in the frequency deviation, a range error $R_e$ 15 is introduced into the target's calculated range $R_c$ 17 at each time instant, T, which leads to target miscalculations. Referring to FIG. 1, in the absence of frequency deviance-induced range errors (i.e., the ideal case wherein no frequency deviation errors exist and therefore no range error $R_e$ 15 (FIG. 2) is introduced), the radar system 100 accurately determines the position of the target vehicle 40 by calculating the actual range $R_c$ 17 and azimuth angle 19 of the target vehicle. Unfortunately, as shown in FIG. 2, frequency deviance creates the range error $R_e$ 15. Consequently, the prior art radar systems disadvantageously miscalculate the position of the target vehicle as being located in the incorrect position shown in FIG. 2 as phantom target vehicle 40' (i.e., $R_c$ is shortened to the incorrectly calculated range shown in FIG. 2).

Referring to FIG. 2, due to errors in the frequency deviation, the radar system 100 miscalculates the range of the target 40 as having a phantom calculated range $R_c$ 17. Thus, the radar system 100 dangerously identifies the target vehicle 40 as being at the position of phantom vehicle 40' having a calculated range $R_c$ 17, rather than as being at the true position of vehicle 40 having an actual range $R_a$ 16. This miscalculation creates a very dangerous situation for collision avoidance systems. False alarms are generated when the radar system 100 mistakenly determines that a target vehicle is in the host vehicle's direction of travel when, in fact, it is not. These false alarms can cause sudden braking and unnecessary steering of the host vehicle 12, which can lead to collisions with the target vehicle or other objects on the road 30.

False alarms can also create a nuisance condition for the operator of the host vehicle 12. The false alarms caused by the range error $R_e$ 15 can cause the operator of the host vehicle 12 to lose faith in the reliability of the radar system 100 and render the system ineffective for warning the operator of real threats. In addition, such false alarms are distracting and disturbing to the operator.

The range errors caused by variances in $\Delta F$ (i.e., the frequency deviance, variations in the frequency deviation $F_1$–$F_2$) in the radar system 100 can be corrected either electrically or mathematically. The frequency deviance can be corrected electrically by adjusting the frequency of the radar system 100. Alternatively, the frequency deviance can be corrected mathematically by accounting for the taking it into account when calculating the calculated range $R_c$ 17. However, regardless of the correction method used in determining the location of targets, it is essential to detect the presence of frequency deviation variation, or frequency deviance. Once detected, it is essential to accurately estimate the frequency deviation variation and to calibrate the radar system accordingly. To date, the prior art systems have provided no solution for the range errors that were introduced by frequency deviance-induced errors.

Accordingly, a need exists for a simple, inexpensive solution to the problem of detecting, estimating, and calibrating the range errors introduced by frequency deviation variations in a radar system. More specifically, a need exists for a method and apparatus that can detect, accurately estimate, and compensate for errors introduced by frequency deviation variations in a radar system. Such a method and apparatus should be simple to implement, inexpensive, and should work with existing radar systems. The present invention provides such a solution.

SUMMARY OF THE INVENTION

The present invention is a novel method and apparatus for range calibration in a radar system. Due to frequency deviation variations occurring in a radar system mainly due to ambient temperature changes, range errors can be introduced when determining target positions. The range errors can be corrected by detecting and estimating frequency deviation error in the radar system. The present invention provides a method and apparatus for detecting and accurately estimating frequency deviation errors in a radar system and calibrating the range errors accordingly. The present invention improves target location performance in a radar system by reducing the errors introduced by frequency deviation error. The present invention relies upon the observation that the integrated Doppler range rate is largely unaffected by frequency deviation error, and thus, is approximately equal to the actual range change. Two fairly simple and easily implemented range calibration techniques are described.

In accordance with a first range calibration technique of the present invention, the radar system measures the range, Doppler range rate (i.e., actual range change), and azimuth angle of a target during at least two successive time instances, $t=t_n$ and $t=t_{n+1}$. If the measured data is qualified, the method corrects the range by updating a first order filter to obtain a frequency deviation correction factor, K, in accordance with the following mathematical formula:

$$R_c = K * Range;$$

where $K = K_{old} + 0.25*(1-C)$, and $K_{old}$=previous value for K; and $$C = \frac{\Delta R_m}{\Delta R_a} = \frac{MeasuredRangeChange}{ActualRangeChange}.$$

The second calibration method of the present range calibration invention relies upon both the observation that the Doppler range rate is unaffected by frequency deviation variation (or frequency deviance) and the observation that certain target tracks provide more reliable data than other target tracks. Thus, tracks with more reliable data are given more weight in calibrating the range. Factors, such as the variance, V, and the number of track data updates, k, determine the reliability of a target track. Target tracks with either a small variance V or a large number of track data set updates k are presumed more reliable and, thus, are given greater weight. The second calibration method qualifies data, updates a first order filter to obtain a frequency deviation correction factor, FFDE(n+1l), and corrects the range using the frequency deviation correction factor FFDE (n+1) in accordance with a variation of the following mathematical formula depending upon the reliability of the data:

$$FFDE(n+1) = (1-G)*FFDE(n) + G*FDEM(n),$$

where,

FDEM(n)=the $n^{th}$ frequency deviation error measurement;

FFDE(n)=the $n^{th}$ estimate of the filtered frequency deviation error; and

G=the filter gain (either a constant or a function of V and k).

The voltage bias implementation of the present method can be used with either the first or second calibration technique. In the voltage bias implementation, the range is corrected by adjusting the voltage of the radar system's RF (radio frequency) source. The voltage bias implementation method relies upon the observation that the main cause of frequency deviation in a radar system is ambient temperature change. Also, the present implementation method relies upon the observation that the frequency deviation of the radar system can be accurately changed by adjusting the voltage to its RF source.

The voltage bias implementation method uses a look-up table containing RF source frequency deviation correction factors corresponding to a variety of ambient operating temperatures. Initially (i.e., when the radar system is first powered up), the look-up table contains pre-set default values containing RF source frequency deviation correction factors in a temperature table which span a large temperature range. Then, the voltage bias method samples the ambient temperature at pre-determined time periods. The voltage bias method calibrates the range by adjusting the voltage level of the RF source according to the frequency deviation correction factor in the look-up table's temperature entry corresponding to the current ambient temperature.

After the system is allowed to reach a steady state temperature and targets are available, the voltage bias implementation method updates the look-up table's frequency deviation correction factors. The method updates the look-up table using the second range calibration technique. When the frequency calibration technique determines a qualified frequency deviation correction factor for the current ambient temperature, the frequency deviation correction factor value for the current temperature bin is replaced by the qualified frequency deviation correction factor. Concurrently, the radar system adjusts the frequency of the RF source.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 shows a condition assuming that the antenna frequency deviation variation is zero.

FIG. 9 shows an exemplary look-up table of frequency deviation correction factors used on one preferred embodiment of the present invention.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The range correction method and apparatus of the present invention increases the accuracy of locating targets in radar systems. Several embodiments of the present method and apparatus are described. For example, two exemplary methods for estimating frequency deviation variation which causes a range error are presented below. These two methods can be independently executed within a radar system to improve the target detection accuracy of the system. The choice of which method to use will depend upon the specific system requirements and available resources within a particular radar system. Alternatively, both methods can be concurrently used by a radar system to verify the results generated by each method, thus providing an improved target detection system having location determination redundancy. It will be obvious to one skilled in the radar and target detection art that alternative methods of determining the range error may be used without departing from the scope of the present invention. In addition, although the range correction method and apparatus of the present invention is described as being used in a vehicular radar system for collision avoidance, the present invention is contemplated for use in any radar platform where target detection and location determination is desirable.

Figure 1:
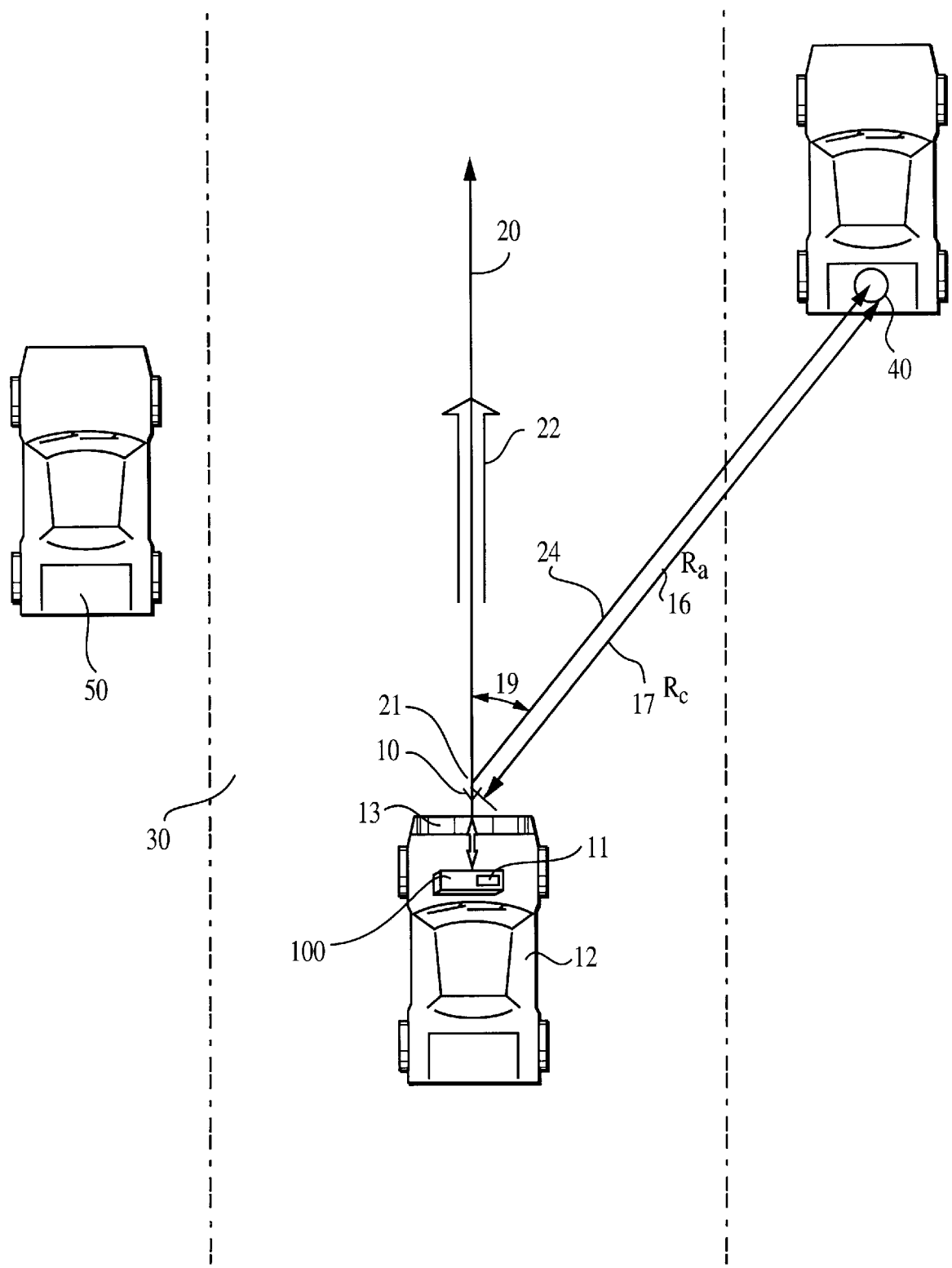
FIG. 1 shows the geometric relationship between a host vehicle and a target vehicle, wherein the host vehicle has a radar system and a radar antenna mounted thereon.
Figure 2:
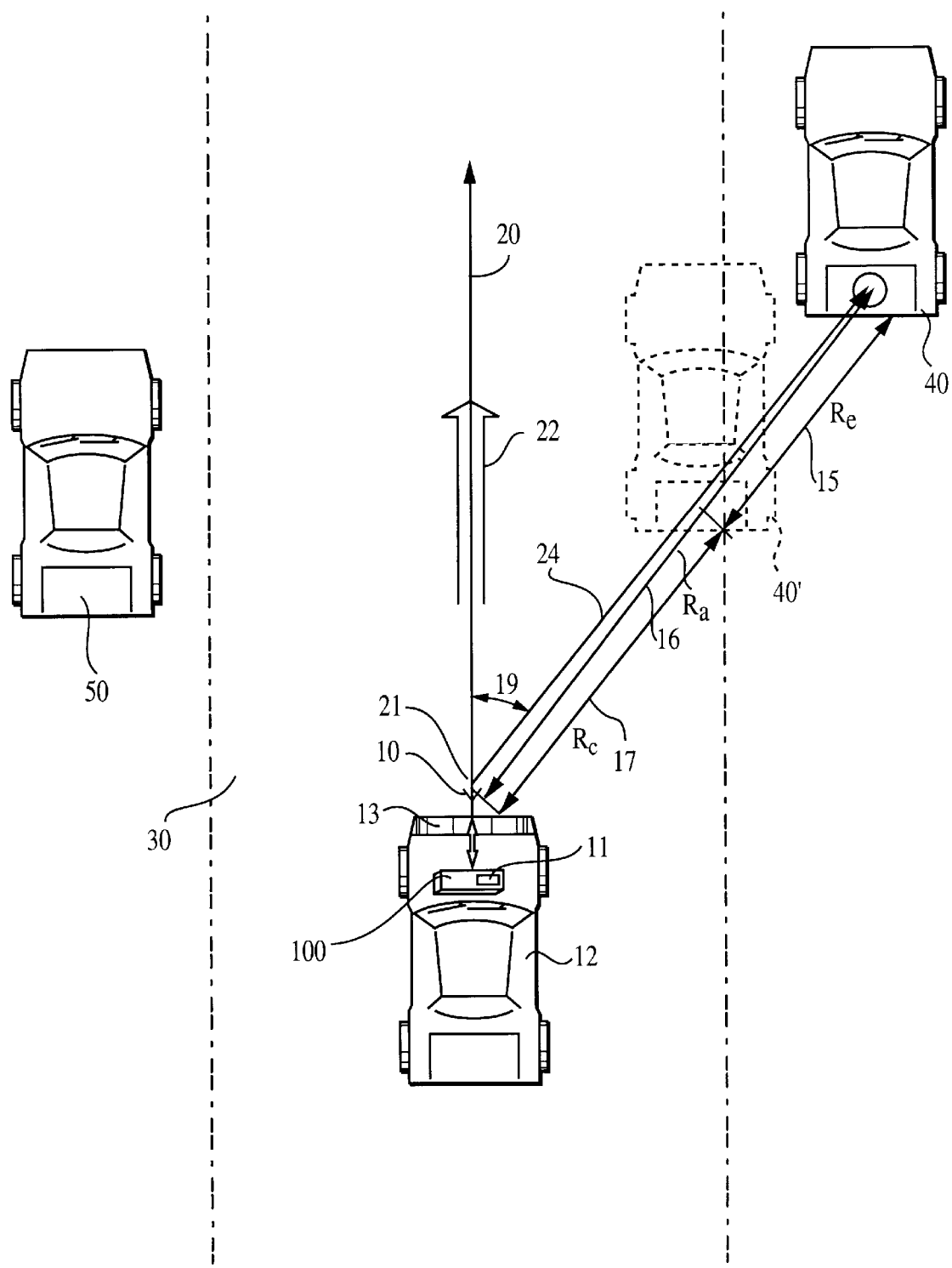
FIG. 2 shows the geometric relationship between the host and target vehicles of FIG. 1, wherein the antenna frequency deviation variation is non-zero.

FIGS. 1 and 2 show a graphic representation of the corrections to target range that are necessary in a vehicular radar system adapted for use with the present invention. As shown in FIGS. 1 and 2, a vehicular radar system 100 is deployed on a host vehicle 12. As described in more detail below with reference to FIG. 8, the vehicular radar system 100 is similar to prior art vehicular radar systems with the exception that the system is adapted for use with the present invention. One exemplary prior art radar system is described in U.S. Pat. No. 5,402,129, issued on Mar. 28, 1995 to Gellner et al. U.S. Pat. No. 5,402,129 is assigned to the owner of the present invention and is herein incorporated by reference. Any other convenient radar system can be utilized by the present invention provided that the radar system 100 is capable of determining the range, azimuth angle 19, and range rate of detected targets. Using the method and apparatus of the present invention, the vehicular radar system 100 aids the operator of the host vehicle 12 in detecting and avoiding collisions with objects that present a danger to the host vehicle 12. The present invention improves the accuracy and reliability of target detection and location determination functions performed by the vehicular radar system 100 and thereby improves the overall collision avoidance performance of the radar system 100.

Two primary functions are performed by the range correction method and apparatus of the present invention: (1) a frequency deviation error is detected and accurately estimated; (2) the radar system 100 is calibrated so that the calculated range, $R_c$, is corrected in light of the detected frequency deviation error. In one embodiment, the radar system may be calibrated by adjusting the frequency of the RF source. This adjustment can be accomplished by adjusting the RF source voltage level so that the frequency deviation error becomes small (i.e., the frequency deviation error is close to zero). Alternatively, the radar system may be calibrated mathematically by compensating for the frequency deviation error when the radar system 100 performs its target range and azimuth calculations. Using this latter approach, as described in more detail below with reference to FIG. 2, the calculated range $R_c$ is preferably multiplied by a frequency deviation correction factor to calibrate the radar system 100. Using the former approach, the RF source frequency is preferably electrically changed to offset the frequency deviation of the radar antenna 10.

As shown in FIGS. 1 and 2, the present invention is disposed on the host vehicle 12 that is shown travelling along a road 30 in a direction of travel 22. A vehicular radar system 100 is preferably deployed within the host vehicle 12 and preferably includes a microprocessor 11 and a radar antenna 10. The method of the present invention is preferably implemented using software or firmware instructions executed by the microprocessor 11 or other data processing or sequencing device disposed within the radar system 100. Alternatively, the method can comprise software or firmware instructions that are executed by any convenient or desirable sequencing device such as a state machine, present state-next state discrete logic, or field programmable gate array device. In another alternative embodiment, the present range calibration method is "hardwired" into the radar system 100 and implemented using either discrete logic devices, large scale integrated (LSI) devices, very large scale integrated (VLSI) devices, or application specific integrated circuit (ASIC) devices. Vehicular radar system 100 may be deployed in any convenient location within the host vehicle 12, such as under the front hood, under the dashboard, within the interior cab, in the trunk, etc.

The radar antenna 10 is preferably mounted to a front bumper 13 of the host vehicle 12. Alternatively, the radar antenna 10 may be mounted to any other convenient surface on the host vehicle 12, such as the front grill, provided that the radar antenna 10 generally faces in a forward direction substantially along in the direction of travel 22 of the host vehicle. In the preferred embodiment of the present invention, the radar antenna 10 comprises a dual lobe monopulse antenna for transmitting a radar transmission signal and receiving the signals reflected back from a target vehicle such as a target vehicle 40 shown in FIGS. 1 and 2. Alternatively, the radar antenna comprises a single patch array antenna capable of both transmitting and receiving radar transmission signals. Due to the phase of the signals transmitted from the two lobes of the monopulse antenna 10, the transmission signal appears to emanate from a single location within the radar antenna 10. The transmitted signal travels from the radar antenna 10 to the target vehicle 40 where it is reflected. The target vehicle 40 reflects the transmission signal back to the two lobes of the radar antenna 10. As described in more detail in U.S. Pat. No. 5,402,129, the radar system 100 determines the amplitude difference between the received signals sensed by the antenna lobes by determining the sum thereof and the difference therebetween and then computing a ratio of the sum and difference signals. The radar system 100 uses information derived from the sum and difference signals in a well-known manner to determine the measured range and azimuth angle 19 of the target vehicle 40. However, due to frequency deviation error present in the system, the calculated range $R_c$ computed by the radar system 100 is often in error and the position of the target vehicle 40 is often miscalculated by the system 100.

Figure 3:
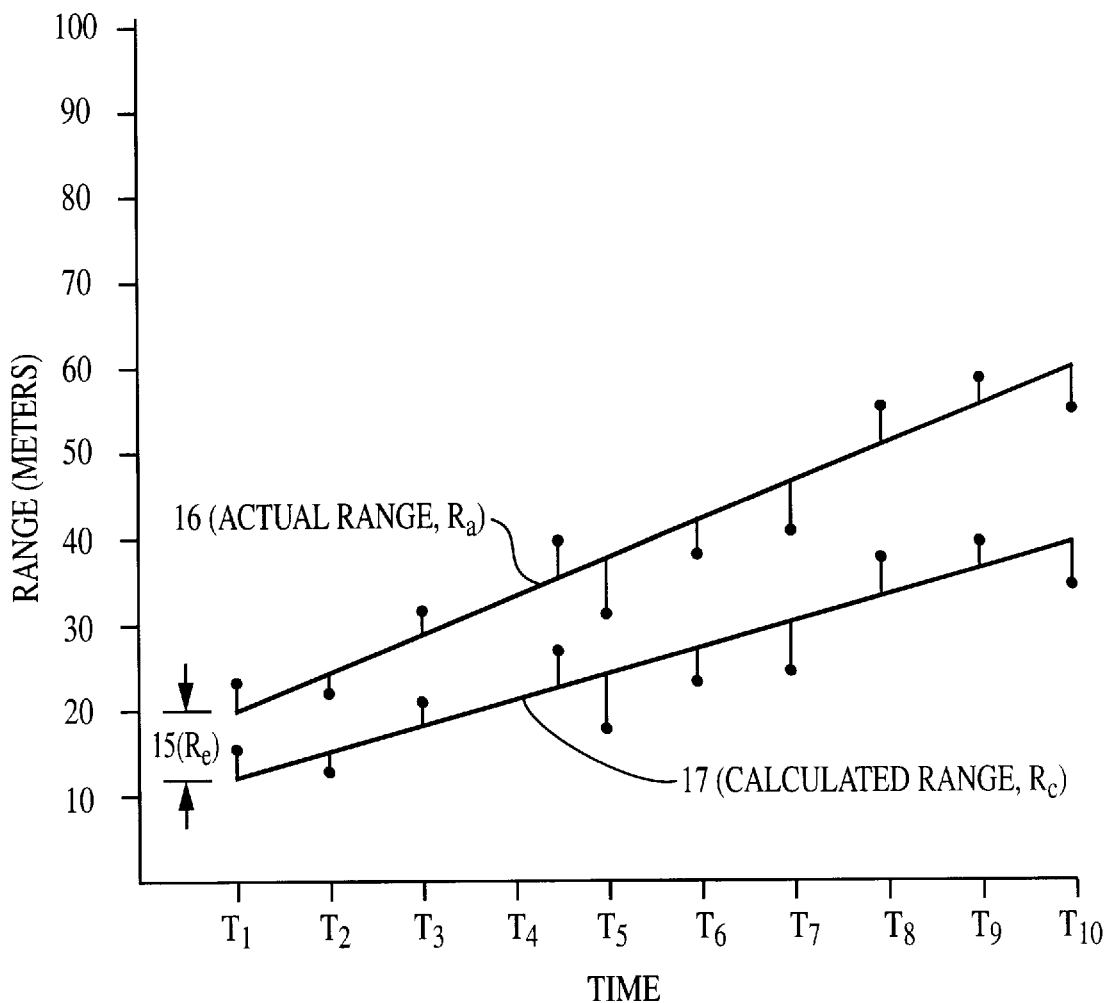
FIG. 3 is a graphic representation of the actual range, calculated range, and range errors over time in a vehicular radar system having frequency deviation errors.

Therefore, an important object of the present invention is to accurately detect the position of the target vehicle 40 by detecting and estimating the frequency deviation error of the radar antenna 10 to compensate for a range error $R_e$ 15. As described above with reference to FIG. 3, the frequency deviation of the radar antenna 10 often deviates creating a range error $R_e$ 15 as depicted in FIG. 2. The range error $R_e$ 15 is the difference between the calculated range $R_c$ 17 and the actual range $R_a$ 16. The radar system 100 detects transmission signals reflected back from the target vehicle 40 and received by the radar antenna 10 and uses these signals to calculate a calculated range $R_c$ 17. However, to correctly determine the position of the target vehicle 40, the radar system 100 must determine the frequency deviation error of the antenna 10.

In one embodiment, Doppler range rate (target velocity) can be used to accurately determine the frequency deviation error of the radar antenna 10. Doppler range rate is largely unaffected by the frequency deviation error because Doppler range rate is calculated from the relative frequency shift between the received frequency signal and the transmitted frequency signal. That is, the Doppler range rate depends only on the relative difference in frequency between the received and transmitted frequencies. Thus, unlike the range measurement, the Doppler range rate measurement is unaffected by frequency deviation errors.

Once the frequency deviation error is estimated, the radar system 100 can compensate for the range error $R_e$ 15 created by the frequency deviation error. For example, in one embodiment the radar system 100 mathematically corrects the calculated range by multiplying the measured range by a frequency deviation error correction factor. In an alternative embodiment the method and apparatus of the present invention calibrates the calculated range by adjusting the frequency of the RF source. The frequency of the RF source is adjusted by electrically varying its voltage level to offset the frequency deviation error. Methods and mechanisms for varying the voltage of the RF source of antenna 10 are well known and are therefore not described in more detail.

In one embodiment of the present invention the radar system 100 comprises a monopulse radar including Doppler and monopulse technology used to obtain range rate, range, and azimuth angle 19. Alternatively, the present invention could utilize a switched-beam, frequency-scanned, or mechanically-scanned radar. Monopulse radar operates with its antenna and energy beam fixed in one position. This allows continuous tracking data on all targets in the antenna detection range without having to interrupt the data flow to switch beams or mechanically rotate the radar antenna 10. Typically, monopulse radar systems can measure the azimuth angle 19 over a range from approximately 6 degrees to the left of antenna reference line 20 (FIG. 1) to 6 degrees to the right of antenna reference line 20 (for a total radar beam width of approximately 12 degrees). The beam width varies with the power delivered to the radar antenna 10. It will be obvious to one skilled in the radar art that the present invention can be used with radar systems having antenna beam widths greater and smaller than 12 degrees.

Figure 5:
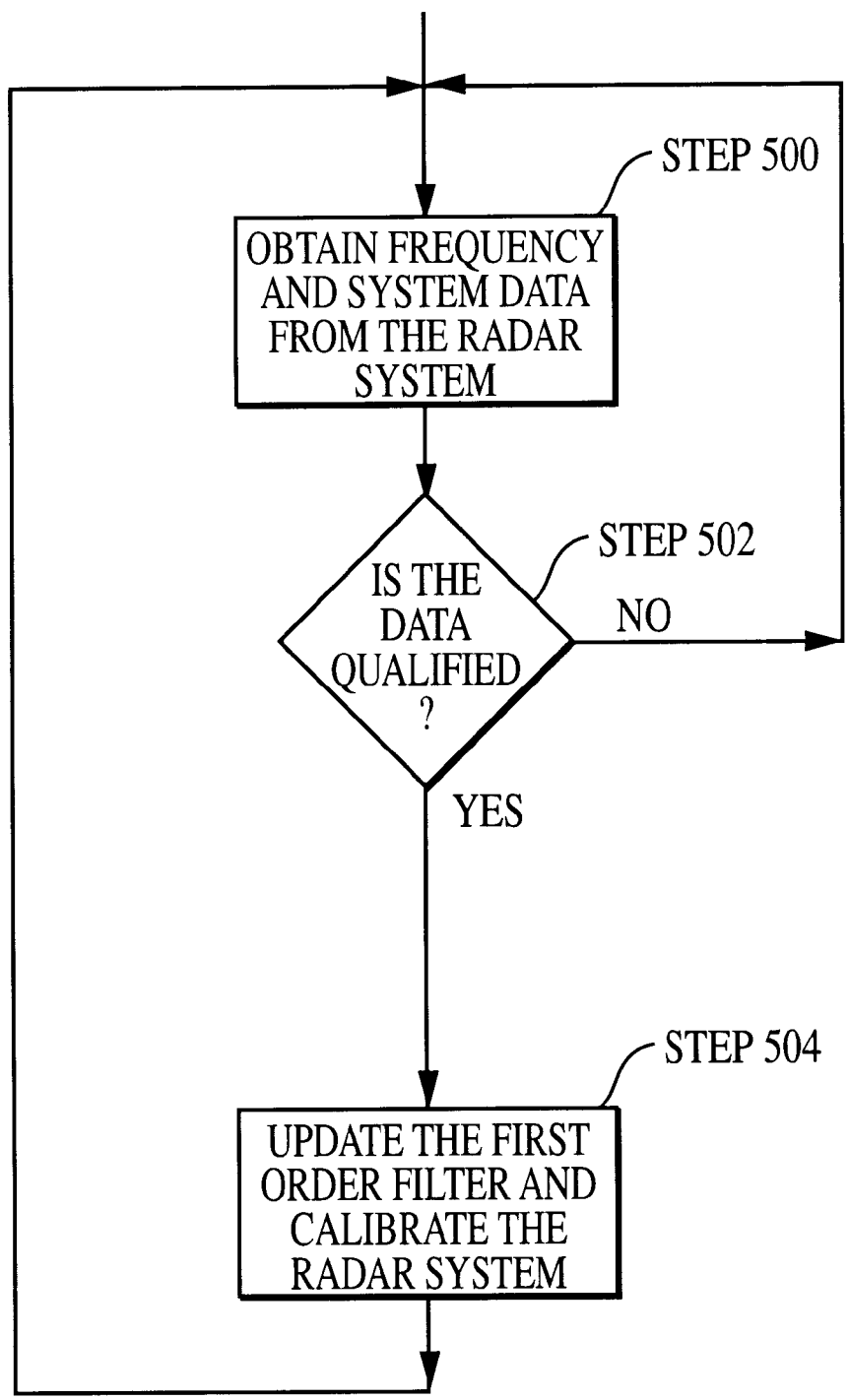
FIG. 5 shows a flowchart of the general technique of the range calibration technique.

As described below in more detail the present range calibration method and apparatus uses several techniques to estimate the frequency deviation error. Referring now to FIG. 5, the general technique to estimate the frequency deviation error comprises three steps: (1) obtain data from the radar system 100; (2) determine if the data is qualified; and (3) calculate the frequency deviation error. In a first embodiment of the present invention, the frequency deviation error is calculated using the target range and the Doppler range rate data generated by the radar system 100 from only one target track during a given time interval. In a second embodiment, the technique calculates the frequency deviation error using the target range and the Doppler range rate data generated by the radar system 100 from multiple target tracks during a given time interval. Both techniques rely upon the observation that Doppler range rate is largely unaffected by frequency deviation error.

A First Calibration Technique for Estimating Frequency Deviation and Correcting Range In one embodiment of the present invention, the radar system 100 measures the range and Doppler range rate of a single target at several successive time instances, t, over a time interval, T. The time interval T is defined as the summation of time instances t (i.e., $T=t_1+t_2+\ldots+t_n$, where n=the total number of time instances). A target can be any object within the detection range of the radar system 100 such as a stationary road sign or a target vehicle 40.

The first calibration technique of the present range calibration method relies upon the observation that the actual range change can be closely estimated from the Doppler range rate. Thus, the ratio of the measured range change to the actual range change can be used to offset the frequency deviation of the radar system 100. The measured range change is defined as the change in range measured by the radar system 100 over the time interval T. In a preferred embodiment, the time instances t are 1/16 seconds apart. However, this specific sampling separation is not meant to limit the present invention. Rather, the method of the present invention can accurately calibrate the range with time instances t at different points than 1/16 seconds. The actual range change is defined as the integral of the Doppler range rate measured by the radar system 100 over the time interval T. The measured and actual range changes are estimated by a mathematical model. In one preferred embodiment, the mathematical model is a set of recursive equations using the qualified outputs of range and Doppler range rate from a tracked target. Because of the time it takes for the mathematical model to converge a tracked target must be qualified as an acceptable target for purposes of calibrating the range.

Thus, to initially qualify as a candidate for range calibration purposes, the target must be within a predetermined target detection range and it must have a target range rate (velocity) relative to the host vehicle 12 that falls within a pre-determined range rate (velocity) range. In addition, the magnitude of the signal reflected back to the radar antenna 10 from the qualifying target vehicle is preferably greater than a pre-determined threshold value and the turn radius of the host vehicle 12 is preferably greater than a pre-determined threshold value. In one embodiment, the target range is less than 90 meters (300 feet) (closing) and is more than 9 meters (30 feet) (receding), the target range rate is greater than or equal to 2.7 m/sec (15 ft/sec), the signal magnitude is greater than or equal to 100 dB, and the turn radius of the host vehicle 12 is greater than 450 meters (1500 feet).

This calibration technique can operate using only two target measurements obtained at two different time instances (e.g., at $t_n$ and $t_{n+1}$, where n=1) after a target is initially qualified. The approach obtains several target range and Doppler range rate measurements from a single target track at several successive time instances. However, to qualify at each successive time instant, the radar system 100 determines the number of data dropouts. A data dropout is defined as a data set that contains bad data. One of ordinary skill in the art would recognize methods of determining a data dropout and therefore this is not described in detail herein. Thus, the data dropout rate should not exceed a pre-determined amount. For example, in the preferred embodiment, the data dropout rate should not exceed either two successive data dropouts or two separate instances of two successive data dropouts.

Should the target data at a successive time instant fail to qualify, the radar system is calibrated using the values from the mathematical model provided that the data is finally qualified. Thus, the last two data measurements must qualify in order for the radar system 100 to calibrate the range. To be finally qualified, the target must be within a pre-determined target detection range and it must have a target range rate (velocity) relative to the host vehicle 12 that falls within a pre-determined range rate (velocity) range. In addition, the magnitude of the signal reflected back to the radar antenna 10 from the qualifying target vehicle is preferably greater than a pre-determined threshold value and the turn radius of the host vehicle 12 is preferably greater than a pre-determined threshold value. For example, in the preferred embodiment, the target range is not greater than 90 meters (300 feet) (receding) and is less than 9 meters (30 feet) (closing), the target range rate has not changed more than 1.52 m/sec (5 ft/sec) from the values observed for at $t_n=1$ and $t_n=2$, the signal magnitude is greater than or equal to 100 dB, and the turn radius of the host vehicle 12 is greater than 450 meters (1500 feet).

A mathematical model comprising a set of recursive equations is used to smooth the range data such as chi-squared or cubic spline smoothing. In the preferred embodiment, the set of recursive equations smooth the range data with least-squared smoothing. Least-squared smoothing of data is well-known in the art and one such method of smoothing is described in "Introduction to Sequential Smoothing and Prediction", by N. Morrison, McGraw Hill, 1969, pp. 339–369 and is herein incorporated by reference for its technique on least-squared smoothing of data. The following set of equations provides least-squared smoothing of the range data:

$$\epsilon(n) = R(n) - [z_0(n-1) + z_1(n-1)]; \quad \text{(Equation 1)}$$

where,

R(n) is the measured range at time interval $t_n$; and $$z_1(n) = z_1(n-1) + \frac{6}{(n+2)(n+1)} * \epsilon(n); \quad \text{(Equation 2)}$$

$$z_0(n) = z_0(n-1) + z_1(n-1) + \frac{2(2n+1)}{(n+2)(n+1)} * \epsilon(n); \quad \text{(Equation 3)}$$

The following equation sums the Doppler range rate data for the target track:

$$I(N) = \sum_{i=1}^{N} R_{dot}(i); \quad \text{(Equation 4)}$$

where, $R_{dot}(i)$ is the Doppler range rate at time $t=t_i$.

The first range calibration technique of the present invention uses the smoothed data of Equation 2 and the Doppler range rate of Equation 4 to calibrate the calculated range.

The first calibration technique preferably executes on any radar system that locates target positions by obtaining a target range and a Doppler range rate for each target vehicle. In one preferred embodiment, the first range calibration technique obtains the target range and target Doppler range rate data for each target track using a monopulse radar system similar to that described in U.S. Pat. No. 5,402,129. However, any convenient radar system can be used in cooperation with the present calibration technique providing that the radar system is capable of determining both the range and the Doppler range rate of a target.

The steps necessary to implement the first calibration technique of the present invention are summarized as follows:

Step 1—Select a target track and measure an initial target range and Doppler range rate for the target track at two successive time instances, $t_n$ and $t_{n+1}$ where n=1.

Step 2—Determine whether the target is qualified by being within a pre-determined detection range, having a range rate (velocity) greater than a pre-determined threshold value, having a signal magnitude greater than a pre-determined threshold value, and having a turn radius of the host vehicle 12 greater than a predetermined threshold value. If the data is qualified the method smoothes the range data using a mathematical model.

Step 3—Obtain more data at successive time instances. Determine whether the target data is qualified by determining if the number of data dropouts exceeds a pre-determined value. If the data is qualified, then the method continues smoothing the range data using the mathematical model in step 2 and the method repeats step 3. Else, the method proceeds to step 4.

Step 4—Determine whether the last two data measurements are qualified by being within a pre-determined detection range, having a range rate (velocity) greater than a pre-determined threshold value, having a signal magnitude greater than a pre-determined threshold value, and having a turn radius of the host vehicle 12 greater than a pre-determined threshold value. If the data is qualified, then the method proceeds to step 5. Else, the method discards the data sets, initiates n=0, and returns to step 1.

Step 5—Update a first-order filter and use it to calibrate the range of the radar system 100, and return to step 1.

Figure 6:
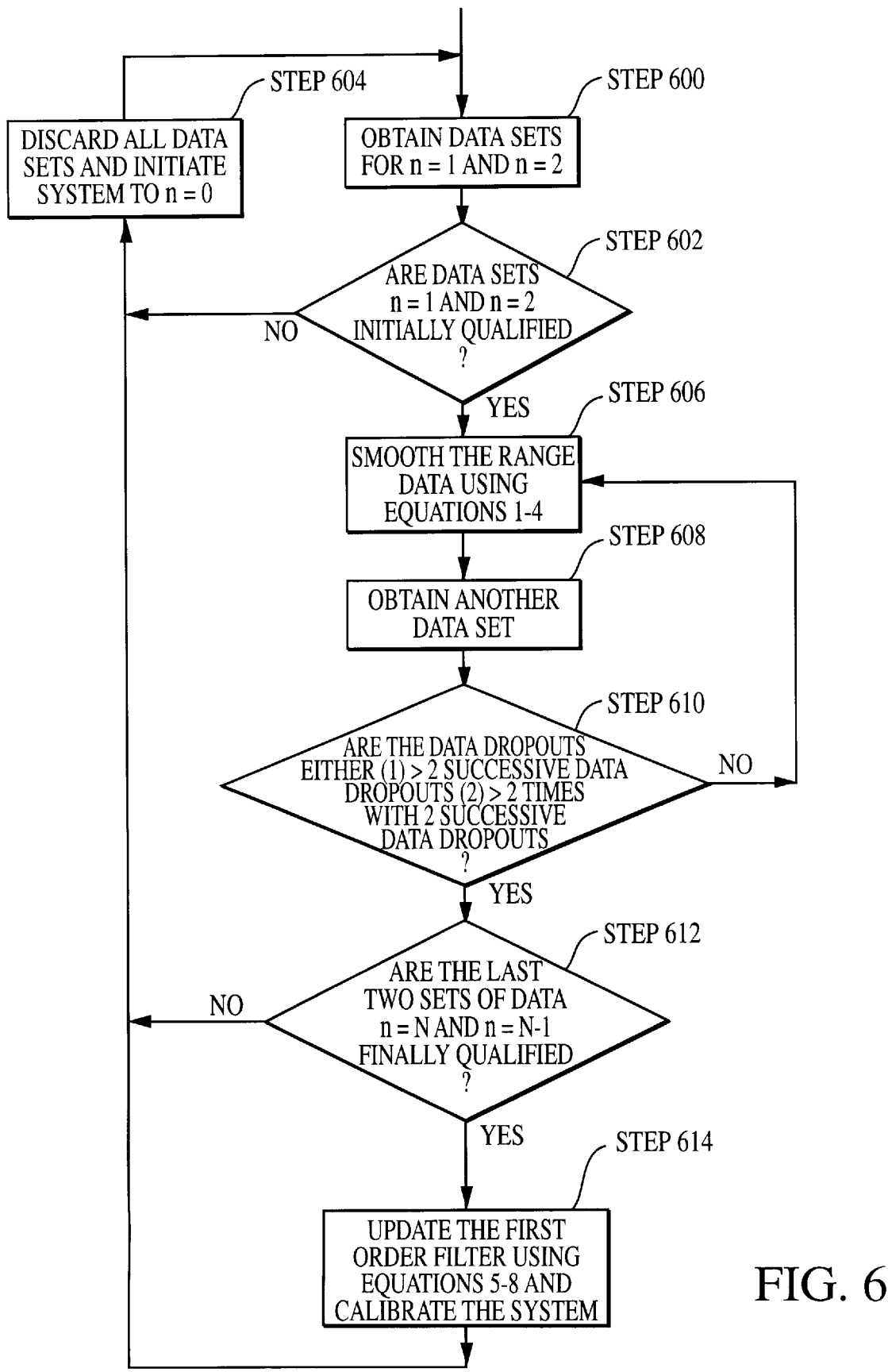
FIG. 6 shows a flowchart of a first range calibration technique of the present invention.

FIG. 6 shows a flowchart of the first range calibration technique of the present invention. As shown in FIG. 6, the method begins at STEP 600 by first obtaining a data set comprising in part the range and Doppler range rate data from the target such as a road sign or target vehicle 40 (FIG. 2). Two sets of data are measured and assigned an index number, n. Thus, in one preferred embodiment, a first set of data measurements comprising time ($t=t_n=t_1$), range, Doppler range rate, signal magnitude, and turn radius is assigned an index of n=1. Similarly, a second set of data measurements comprising time ($t=t_n=t_2$), range, Doppler range rate, signal magnitude, and turn radius is assigned an index of n=2. However, the set of data measurements can also comprise more measurements such as azimuth angle 19.

The method proceeds to step 602 to determine whether the data meets certain initial qualifications. If so, the data meets the threshold criteria and is smoothed. In one preferred embodiment of the present invention, the initial qualifications include the target range, Doppler range rate, signal magnitude, and turn radius of the host vehicle 12. However, other parameters may be used to qualify the target data for use in the calibration techniques of the present invention. Further, all of the qualifying restrictions can be varied without departing from the scope of the present invention. The values given below are exemplary only and were obtained through experimentation. Thus, in one preferred embodiment, the target vehicle 40 at both time $t=t_1$ and $t=t_2$ is preferably at a range of less than 90 meters (300 feet) (closing) and more than 9 meters (30 feet) (receding). However, the present method can accurately calibrate the range when the target vehicle 40 is closer or further from the host vehicle 12. Also, in the preferred embodiment, the Doppler range rate of the target vehicle 40 at both time $t=t_1$ and $t=t_2$ preferably exceeds a predetermined threshold value such as 2.7 m/sec (15 ft/sec). Again, however, the present method can be used when the target Doppler range rate is less than 2.7 m/sec (15 ft/sec). In addition, in the preferred embodiment, the magnitude of the signal reflected back from the target vehicle 40 and the turn radius of the host vehicle 12 at both time $t=t_1$ and $t=t_2$ preferably exceed a pre-determined threshold value. For example, in one embodiment, the magnitude of the signal reflected back from the target vehicle 40 preferably exceeds 100 dB and the turn radius of the host vehicle 12 preferably exceeds 450 meters (1500 feet). However, although these are preferable conditions, the present method can accurately calibrate the range when the signal magnitude is less than 100 dB and the turn radius is less than 450 meters (1500 feet).

If the above qualifications of STEP 602 are not met for data set n=1 and n=2, then the method proceeds to STEP 604 where the two data sets are discarded and the system is initiated to n=0. The method then returns to STEP 600 to obtain two new sets of data. If the above qualifications are met for data sets n=1 and n=2, then the method proceeds to STEP 606 where the range data is smoothed using a mathematical model.

In a preferred embodiment, at STEP 606 the present method smoothes the range data with the set of least-squared recursive equations described above (Equations 1–4). The present method can alternatively calibrate the range using several different types of smoothing using mathematical models such as chi-squared or cubic spline smoothing. Once the target data is smoothed, the method proceeds to STEP 608.

At STEP 608 the present method obtains another data set from the target track of STEP 600 at a new time instance. In a preferred embodiment, the time instances are 1/16 seconds apart. However, this is not a limitation of the present invention. The method of the present invention can accurately calibrate the range using time instances different than 1/16 of a second. The data set is indexed with the next highest index number available. For example, if the last index number is n=2, then the data set of STEP 608 is assigned an index number n=3 with $t=t_3$. The present inventive method proceeds to STEP 610 to determine whether the number of data dropouts exceeds a pre-determined number.

At STEP 610 the number of data dropouts in the current target track preferably cannot exceed either two successive data dropouts or two occurences of two successive data dropouts. However, the present method can be used with a less-restricitve pre-determined number of data dropouts. If the number of data dropouts does not exceed the pre-determined number of STEP 610, then the method returns to STEP 606 to further smooth the range data using the least-squared smoothing equations (Equations 1–4) and the data set from STEP 608. If the number of data dropouts exceeds the qualifications of STEP 610, then the present method proceeds to STEP 612.

At STEP 612 the present method determines whether the last two data sets meet certain final qualfications. Thus, if the total number of data sets is N, then data set n=N and n=N−1 are the last two data sets. For example, if the total number of data sets is 6, then data set n=6 and n=5 are the last two data sets. In one preferred embodiment of the present invention the final qualifications include the target range, Doppler range rate, signal magnitude, and turn radius of the host vehicle 12. However, other parameters may be used to qualify the target data for use in the calibration techniques of the present invention. Further, all of the qualifying restrictions can be varied without departing from the scope of the present invention. Thus, in one preferred embodiment, the target vehicle 40 at both times $t=t_N$ and $t=t_{N-1}$ is preferably at a range of less than 90 meters (300 feet) (receding) and more than 9 meters (30 feet) (closing). However, the present method can calibrate the range when the target vehicle 40 is closer to or further away from the host vehicle 12. The Doppler range rate of the target vehicle 40 at both time $t=t_N$ and $t=t_{N-1}$ preferably has not changed more than 1.52 m/sec (5 ft/sec) from the Doppler range rate at times $t=t_1$ and $t=t_2$. Again, however, the present method can be used when the target Doppler range rate changes more than 1.52 m/sec (5 ft/sec) from the initial Doppler range rate. In addition, the magnitude of the signal reflected back from the target vehicle 40 preferably exceeds 450 meters (1500 feet) at both times $t=t_1$ and $t=t_2$. However, the present method can be used when the signal magnitude is less than 100 dB and when the turn radius is less than 450 meters (1500 feet).

If the data of STEP 612 fails to meet the final qualifications, then the method proceeds to STEP 604 where all the data sets are discarded and the system is initiated to n=0. The method returns to STEP 600 to obtain two new sets of data. If the data of STEP 612 meets the final qualifications, then the method proceeds to a STEP 614 to update the frequency deviation correction factor using a first order filter and the method thereby calibrates the system.

At STEP 614, the first order filter for the target is calculated using the smoothed data from STEP 606 (Equations 1–4) and Equations 5–9 below. Equation 5 shows the calculation for the measured range change, $\Delta R_m$, using the last data update of the recursive Equation 2:

$$\Delta R_m = N^* z_1(N); \quad \text{(Equation 5)}$$

Equation 6 shows the calculation for the actual range change, $\Delta R_a$, using the last data update of the summation Equation 4:

$$\Delta R_a = I(N)^* \Delta t; \quad \text{(Equation 6)}$$

Equation 7 uses the values from Equations 5 and 6 to determine a gain, C:

$$C = \frac{\Delta Rm}{\Delta Ra} = \frac{MeasuredRangeChange}{ActualRangeChange};\quad \text{(Equation 7)}$$

Equation 8 is a recursive first order filter using the gain C and yielding a frequency deviation correction factor, K:

$$K = K_{old} + 0.25*(1-C);\quad \text{(Equation 8)}$$

The method calibrates the range of the radar system 100 (FIG. 8) using a first order filter such as Equation 8 yielding the frequency deviation correction factor K. Although Equation 8 is preferred, other first order filters may be used in alternative embodiments of the present invention to accurately calibrate the range of the radar system 100. In the preferred embodiment of the present invention, Equation 9 below is used to mathematically correct the range of the radar system 100 by scaling it with the frequency deviation correction factor K:

$$R_c = K * Range;\quad \text{(Equation 9)}$$

The system can be calibrated in an alternative manner such as by biasing the RF (radio frequency) source of the radar system 100 to compensate for the frequency deviation correction factor K. Other calibration methods such as biasing voltages are well known to one of ordinary skill in the art. One exemplary voltage bias method is described in detail below.

The method is re-initiated by proceeding to STEP 604 where all data sets are discarded and the system is initiated to n=0. After STEP 604, the method returns to STEP 600 to obtain two new sets of data.

As described above, in one embodiment, it is preferred that the two initial data sets be initially qualified and the last two data sets be finally qualified. In alternative embodiments these restrictions on the target vehicle need not be rigidly followed in order to take advantage of the present range calibration method. Although the qualifying restrictions on the target vehicle described with reference to the preferred embodiment may, under some circumstances, limit the qualification of a number of target vehicles, it should be noted that range calibration will be infrequently required in a temperate environment. Therefore, in a temperate environment, only a few targets must qualify over a long period of radar system operation. Consequently, the restrictions described above with reference to the preferred embodiment do not adversely affect the utility of the present invention.

When the calibration method is used in a vehicular radar system the radar system's target range is corrected with a frequency deviation correction factor calculated from a first order filter before being used for collision warning and cruise control functions. Each newly calculated frequency deviation correction factor replaces a previously calculated frequency deviation correction factor. The calibration technique described above with reference to FIG. 6 is opportunistic in the sense that many targets are monitored continuously to find a qualifying target. The opportunity for calibration may be explored using a number of targets concurrently and continuously.

The technique described essentially uses a first order filter to estimate the frequency deviation correction factor or error. This filter uses a constant gain value (e.g., 0.25 in Equation 8). A major enhancement of this approach is provided by a second technique, described below, in which the filter gain is adaptive to statistical variations in multiple target tracks.

A Second Calibration Technique for Estimating Frequency Deviation and Correcting Range The second technique of the present range calibration method is similar to the first calibration technique in that it relies upon the observation that the actual range change can be closely estimated from the Doppler range rate. Thus, the ratio of the measured range change to the actual range change can be used to offset the frequency deviation of the radar system 100. However, in contrast to the first calibration technique described above, the second calibration technique uses data from multiple tracks during a given time period. This data is used to calibrate the range. Each track represents a different target such as a road sign or a target vehicle 40, 50 (FIGS. 1 and 2). The second calibration technique also relies upon the observation that certain target tracks provide more reliable data than other target tracks.

In accordance with this technique, tracks with more reliable data are given more weight in calibrating the range. In the preferred embodiment, the variance, V, of a target track provides information on the reliability of the data set of the target track. Variance V is a statistical term defined as the difference between the individual data points of a data set and the mean value of the data points. Thus, target tracks with lower variances are given more weight in calibrating the range because they are presumed to be more reliable. These variances are found to have chi-squared statistical distribution. In the preferred embodiment, the number of track data set updates, k, provides information on the reliability of the data set of a target track. In a preferred embodiment, target tracks with higher k values (i.e., more track data set updates) are given more weight in calibrating the range. In sum, more weight is given to a target track with either a small variance V or a large number of track data set updates k.

However, other qualifications for increasing the reliability of data can be used with the second calibration technique of the present invention.

After a target track expires, the target track data set must be qualified to update a frequency deviation correction factor, FFDE. One possibility for a target track expiring is when it falls outside the detection range of the radar system 100. The detection range, usually limited by power and other factors, is variable and should not be viewed as limiting the present invention. The second calibration technique of the present method updates the frequency deviation correction factor FFDE with the gain G of the expired target track. In one preferred embodiment, the method of determining the gain G depends on the number of track data set updates k of an expired track. For example, if the number of track data updates k is greater than a predetermined number such as 6, then the gain G is a function of both the variance V and the number of track data set updates k. This is the case because the track data set is sufficiently reliable to calculate the gain G. Else, the gain G is a constant value. Estimates of the variance are unreliable for very small sample sets. The sample sets are very small when k is less than 6. However, the gain G can alternatively be a function of other characteristics of the track data set. The gain G is used to update the first order filter. The frequency deviation correction factor is calculated using a first order filter. The range is preferably calibrated using either a mathematical correction or an RF source correction.

The steps necessary to implement the second calibration technique of the present invention are summarized below as follows:

Step 1—Obtain a data update on a target track and store the data update in a track data set corresponding to the target track.

Step 2—Determine whether the track has expired (i.e.— no more data is available on the track. This may be caused by the target being out of the detection range of the radar system 100). If the track has not expired then the method returns to Step 1 to obtain a data update on any target track. Else, the method proceeds to Step 3.

Step 3—Determine whether the number of track data updates k is greater than a pre-determined number. If so, then the method proceeds to Step 5. Else, the method proceeds to Step 4.

Step 4.—Update a first order filter with constant gain G using the track data set of the expired track. Use the frequency deviation correction factor to calibrate the range. The method returns to Step 1.

Step 5—Update a first order filter using a gain G calculated from a variance weighted value of the track data set of the currently expired track. Use the frequency deviation correction factor to calibrate the range. Then, return to Step 1.

Figure 7:
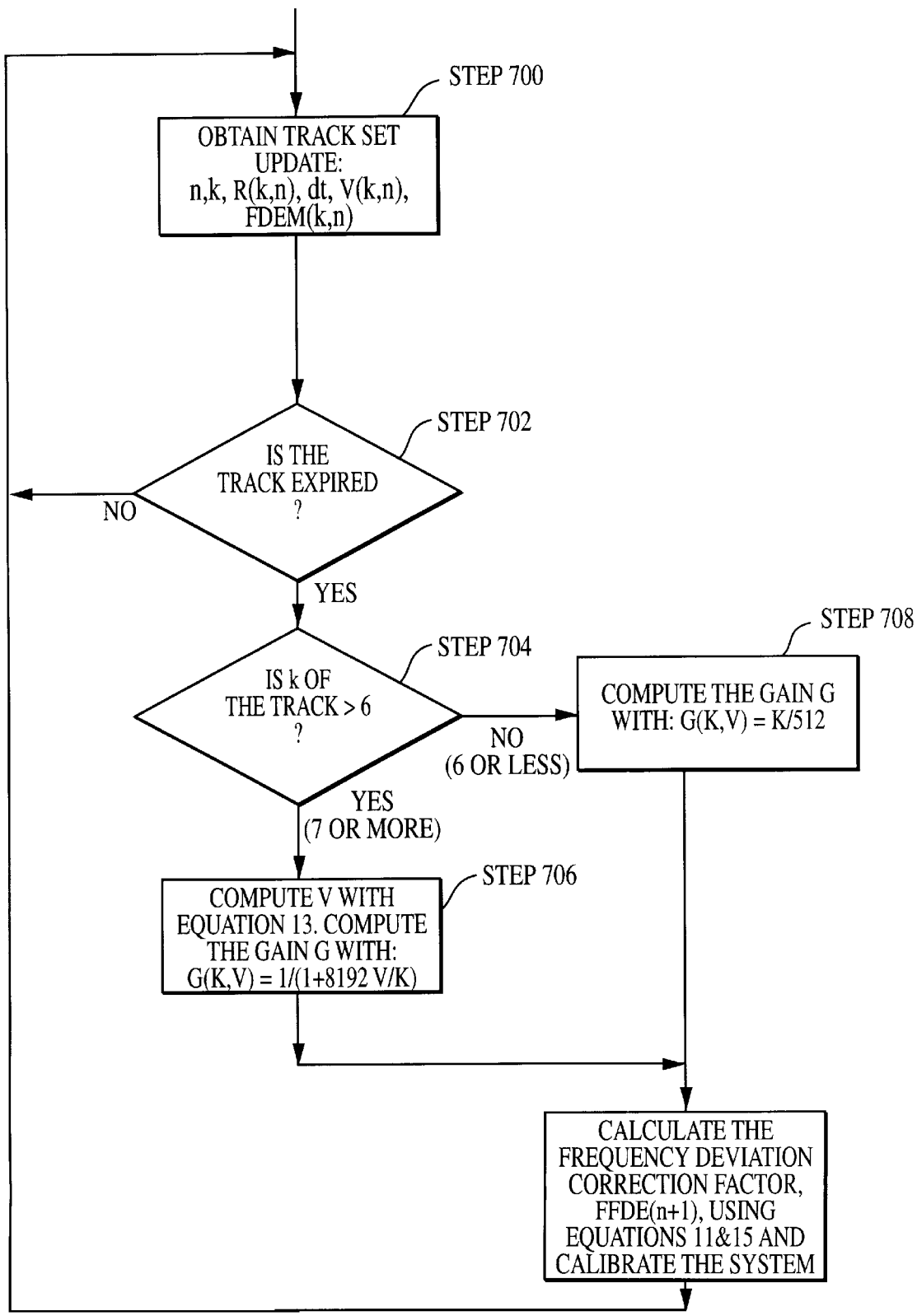
FIG. 7 shows a flowchart of a second range calibration technique of the present invention.

FIG. 7 shows a flowchart of the second range calibration technique of the present invention. As shown in FIG. 7, the method begins at a STEP 700 by first obtaining a track data update for a target track from the radar system 100. In a preferred embodiment, a track data update comprises the following:

1) n=track index number for the track data set;
2) k=count of track data updates in track n;
3) R(k,n)=measured range of the $n^{th}$ target track at time $t=t_k$;
4) dt=time span between the measurement samples;
5) V(k,n)=Doppler range rate of the $n^{th}$ target track at time $t=t_k$; and
6) FDEM(k,n)=Frequency Deviation Error Measurement of the $n^{th}$ target track at time $t=t_k$;

In an alternative embodiment of the second calibration technique of the present invention the method calculates FDEM(k,n) using the following formula:

$$FDEM(k, n) = \frac{(R(k) - R(k-1))}{(0.5 V(k)dt + 0.5 V(k-1)dt)};$$ (Equation 10)

where,

R(k) is the $k^{th}$ estimate for the range to the target;
V(k) is the $k^{th}$ estimate for the target velocity from the Doppler range rate;
and
dt is the time span between measurement samples.

In a preferred embodiment of the present invention, the time span dt is a constant number. For example, a radar system that measures a target track every 1/16 of a second having a track data set update every other target track measurement has a time span dt of 2/16 of a second.

Figure 4:
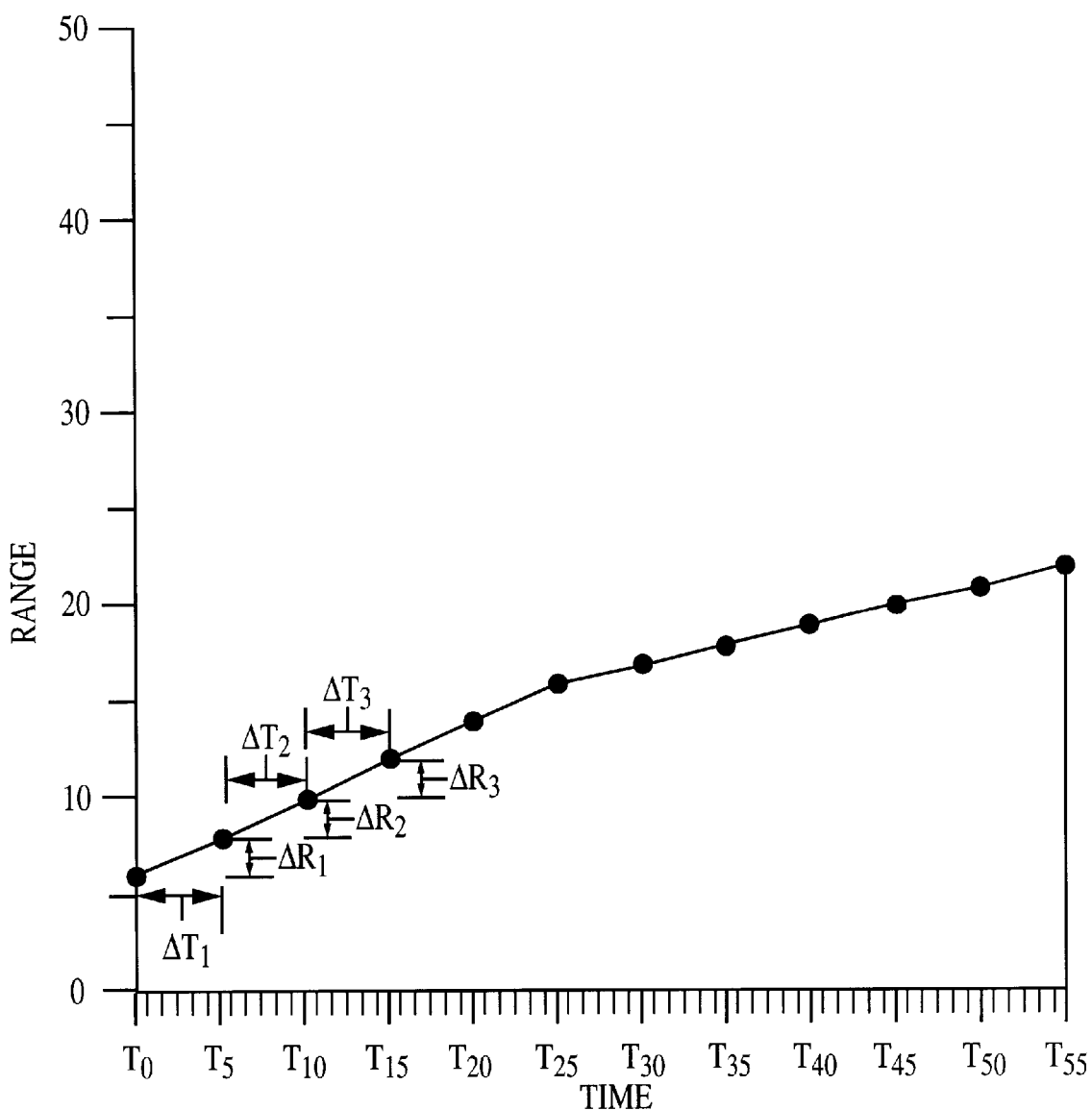
FIG. 4 is a graphic representation of the Doppler range rate showing range versus time of a vehicular radar system having frequency deviation errors.

In yet another alternative embodiment of the present calibration method, the track data set is updated every 5 target track measurements. Thus, R(k,n) is an average of these five range values and the measured range rate is calculated by dividing R(k,n) by the time span dt. However, any number of updates per track data set update can be used without departing from the scope of the present invention. For example, a radar system having a target track measurement every 1/16 of a second has five values for range over 5/16 of a second. Referring again to FIG. 4, the five target track range measurement values corresponding to $T_0$–$T_5$ are averaged to estimate $\Delta R_1$. Similarly, the time spans from $T_0$–$T_5$ are added together to obtain $\Delta T_1$(dt). These values are used to calculate R(k,n) as described above.

A track data set for the $n^{th}$ target track consists of k sets of track data updates. Thus, a new target track is assigned the next highest unused number as its track index number. When a second track data update occurs for an existing target track, the track index number n remains the same and k increases to 2. The following example of a preferred embodiment is provided to clarify STEP 700 and the overall operation of the second calibration technique:

Initially, the radar system 100 is turned on and contains no target track data. After some period of time, the radar system 100 obtains its first track data update. The track data update corresponds to a target vehicle (e.g., target vehicle 40 of FIGS. 1 and 2). A track data set is created and stored containing the first track data update values for n, k, R(k,n), dt, V(k,n), and FDEM(k,n). The target track is assigned a new track index number of n=1 because it is the first target track after initiating the radar system. The count of updates k for the track data set corresponding to the target vehicle 40 is assigned the value of k=1. The count of updates k is assigned the value of k=1 because there is only one track data update for this target track.

The radar system 100 then obtains its second track data update. However, the second track data update corresponds to a second (e.g., the target vehicle 50 of FIGS. 1 and 2). A track data set is created and stored containing the current track data update values for n, k, R(k,n), dt, V(k,n), and FDEM(k,n). The target track is assigned a new track index number of n=2 because it is the second target track after initiating the radar system. The count of updates k for the track data set corresponding to the second target vehicle is assigned the value of k=1 because there is only one track data update for this target track n=2.

The radar system 100 then obtains its third track data update. Similar to the first track data update, the current track data update corresponds to the first target vehicle (e.g., the target vehicle 40). The current track data update is added to the track data set corresponding to the first target vehicle (i.e., n=1) and stored containing the current track data update values for n, k, R(k,n), dt, V(k,n), and FDEM(k,n). The target track index number remains n=1 because it corresponds to the first target track. The count of updates k for the current track data set is assigned the new value of k=2 because this is the second track data update for target track n=1.

At STEP 702, the second calibration method determines whether the target track has expired. In one embodiment, a track is determined to be expired if the track fails to continuously update every 1/16 seconds in order to allow the value of k to increment for the frequency correction algorithm. A target track also expires when it is out of the detection range of the radar system 100. In a preferred embodiment, the radar system 100 determines when a target track has expired by determining whether the target track has updated within a pre-determined amount of time. However, alternatively the second calibration method of the present invention can use other time periods or different methods of determining when a target track is out of the detection range. If the target track has not expired, then the present method returns to the STEP 700 to obtain another track data update. Else, the method proceeds to the STEP 704 to determine whether the number of track data updates k of the track data set of the expired target track exceeds a predetermined number.

At the STEP 704 the present inventive calibration method determines whether the track data set is sufficiently reliable to calculate the gain G from the target track data set. A track data set with a higher number of track data updates k is presumed to provide more reliable data. Thus, the number of track data updates k preferably exceeds a pre-determined number. In a preferred embodiment of the second calibration method the pre-determined number of track data updates k is 6. This value of k is exemplary and has been obtained through experimentation. If the number of target track data updates k of the expired target exceeds 6 the method proceeds to STEP 706 because the track has enough data to reliably calculate a gain G from its track data set. Else, the method proceeds to STEP 708 where the method uses a constant gain G.

At STEP 706, the method shown in FIG. 7 calculates a frequency deviation correction factor FFDE(n+1) using a first order filter. The method calibrates the range. The second calibration method performs a series of calculations using the track data set values for the expired target track. The method calculates the first order filter using the gain G (expressed as G(k,V)), the variance V, and the number of track data updates k. In a preferred embodiment, the method of the present invention uses the following equations to calculate the frequency deviation correction factor:

ADEM(n)=the average value of all of the FDEM's for target track n. Thus, $$ADEM(n)=(FDEM(1,n)+FDEM(2,n)+\ldots+FDEM(k-1,n)+FDEM(k,n))/k; \quad \text{(Equation 11)}$$

where, k=the number of target track updates; and
n=the track number;

The sum of 1 through k (FDEM)$^2$ is:

$$\text{Sum of } FDEMs \text{ Squared} = \sum_{i=1}^{k} [FDEM(i, n)]^2; \quad \text{(Equation 12)}$$

V=the variance of the FDEMs=(Sum of FDEMs Squared-k*(ADEM ))/(k−3). Thus, $$V = \frac{\left[\sum_{i=1}^{k} [FDEM(i, n)]^2\right] - [k^* ADEM(n)]}{k-3}. \quad \text{(Equation 13)}$$

To ensure stability, the gain G is preferably given a value of $$x \cong \frac{x}{1+x}.$$

A substitiution for x can be made such as x=GS*Vs*k/V, where GS=the gain for stray targets=$\frac{1}{512}$ and Vs=the variance for stray data=$\frac{1}{16}$. The values given for GS and Vs are exemplary only and were obtained through experimentation. These values can be varied without departing from the scope of the present invention. Thus, the gain G(k,V) is determined by Equation 14 below:

$$G(k, V) = \frac{GS^* Vs^* k / V}{1 + GS^* Vs^* k / V} \quad \text{(Equation 14)}$$
$$= \frac{GS^* Vs}{V/k + GS^* Vs}$$
$$= \frac{1}{1 + 8192^* V/k}$$

Equation 14 is valid if k is greater than 6. Otherwise, G(k,V)=k/512.

The method then calculates a value for a frequency deviation correction factor FFDE(n+1) using the gain G(k,V):

$$FFDE(n+1)=(1-G(k,V))^*FFDE(n)+G(k,V)^*ADEM(n); \quad \text{(Equation 15)}$$

The calibration method of FIG. 7 calibrates the range value at STEP 706. The range is preferably mathematically calibrated. However, the range can also be calibrated by adjusting the frequency of the RF source of the radar system 100. The range is mathematically calibrated using the frequency deviation correction factor FFDE(n+1) in accordance with Equation 16 below:

$$R_{calibrated}=Range/FFDE(n+1); \quad \text{(Equation 16)}$$

The method returns to STEP 700 to obtain another track data update.

As shown in FIG. 7, when the method determines at STEP 704 that there is insufficient data reliability in the track data set, the method calculates the frequency deviation correction factor FFDE(n+1) at STEP 708 using a constant gain G. The radar system is calibrated either mathematically or using a frequency adjustment on the RF source. The second calibration method performs a series of calculations at STEP 708 using the track data set values for the expired target track. The method calculates the first order filter using a constant gain G, expressed as Gs (the gain for stray targets), and the number of track data updates k. In a preferred embodiment, the method of the present invention uses the following equations to calculate the first order filter:

ADEM(n)=the average value of all the FDEM's for target track n. Thus, $$ADEM(n)=(FDEM(1,n)+FDEM(2,n)+\ldots+FDEM(k-1,n)+FDEM(k,n))/k; \quad \text{(Equation 17)}$$

where, k=the number of target track updates;
n=the track number; and

The calibration method calibrates the range value of the radar system 100 at STEP 708. The range is preferably mathematically calculated. However, the range can also be calibrated by adjusting the frequency of the RF source of the radar system 100. In the preferred embodiment, the range is mathematically calibrated using the first order filter (frequency deviation correction factor), FFDE(n+1), in accord with Equation 16. As shown in FIG. 7, the method returns to STEP 700 to obtain another track data update.

The radar system's target range is preferably corrected with a frequency deviation correction factor FFDE(n+1) before it is used for collision warning and cruise control functions. Each newly calculated frequency deviation correction factor replaces a previously calculated frequency deviation correction factor. The technique described above with reference to FIG. 7 is opportunistic in the sense that many targets may be continuously monitored until a target track expires. The data from the expired track's data set is preferably used to calibrate the range.

Figure 8:
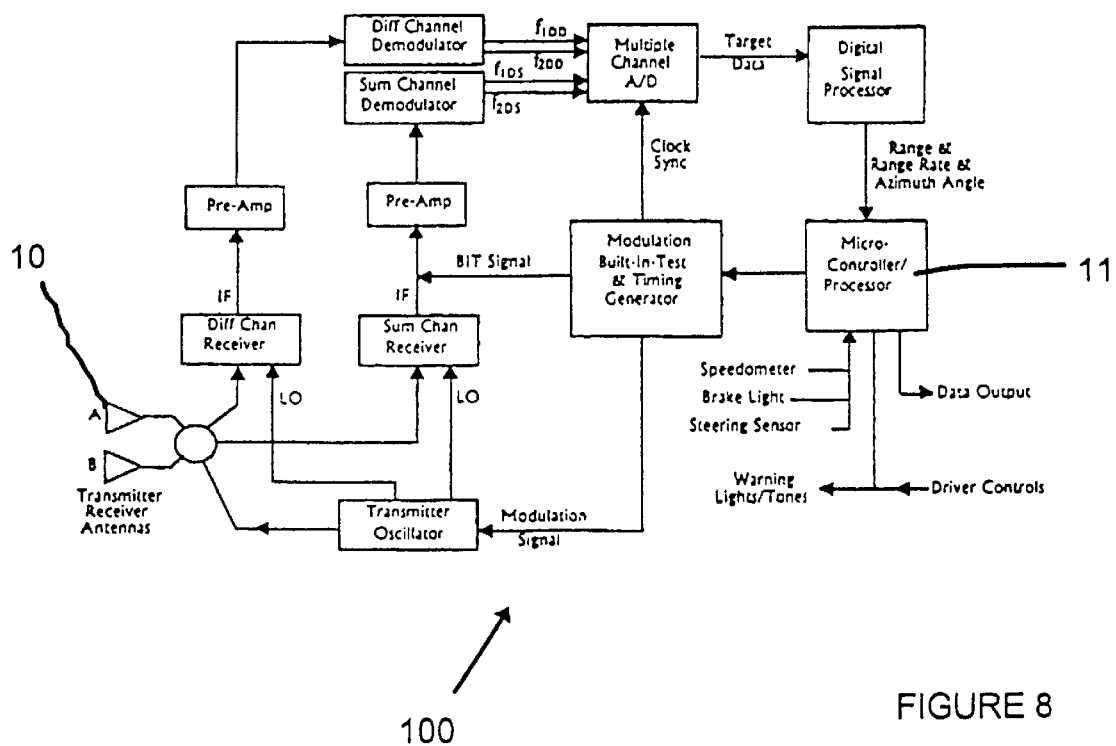
FIG. 8 shows a block diagram of a radar system adapted for use with the range calibration method and apparatus of the present invention.

FIG. 8 shows a block diagram of a radar system 100 that is adapted for use with the range calibration method and apparatus of the present invention. An understanding of the function and operation of many of the components of the radar system 100 are not essential to understanding the present invention and therefore are not described in more detail herein. A detailed description of a radar system similar to that shown in FIG. 7 is provided in U.S. Pat. No. 5,402,129. In one embodiment, the radar system 100 is a monopulse radar system and a multiple-frequency modulated system. The radar system uses a very narrow bandwidth and is thus extremely spectrum efficient. The narrowband system was developed to operate in the existing FCC Part 15 unlicensed band at 24.725 GHz with an authorized bandwidth of only 100 MHz. Alternatively, 46.8 GHz and 76.5 GHz can be used to allow bandwidths of 200 MHz and 1000 MHz, respectively. The frequency and bandwidth are variable and are not limitations of the present invention. In one embodiment, the antenna has a 3 dB half-power beamwidth that is 6 degrees in azimuth and 5 degrees in elevation with an antenna aperture size of 15 cm high by 20 cm wide. Other configurations can be used to practice the present invention.

As described above, the radar system 100 preferably includes a radar antenna 10 and a microprocessor or microcontroller 11. The range calibration techniques described above with reference to FIGS. 1–7 preferably comprise software instructions that are executed by the microprocessor 11 in the radar system 100. Alternatively, the calibration techniques may be implemented in firmware or hardware specifically designed for the purpose. Any convenient means for implementing the calibration techniques described above may be used by the radar system 100 without departing from the scope of the present invention.

Voltage Bias Implementation of the Present Method

Both the first and second calibration techniques described above with reference to FIGS. 6 and 7 can calibrate the radar system by adjusting the frequency of the radar system's RF (radio frequency) source (e.g., Gunn Diode). The voltage bias implementation method relies upon the observation that the frequency of the radar system 100 can be accurately changed by adjusting RF source voltage values. The present method also relies upon the observation that the main cause of frequency deviation in a radar system 100 is ambient temperature change.

The voltage bias implementation preferably uses a look-up table containing RF source frequency deviation correction factors corresponding to a variety of ambient operating temperatures. Initially (i.e., when the radar system is first powered up), the look-up table contains pre-set default values containing RF source frequency deviation correction factors (obtained through experimentation) in temperature bins which in total span a large temperature range (such as between 40 and 95 degrees Celsius). The voltage bias method samples the ambient temperature at pre-determined time intervals (e.g., once per minute). The present method calibrates the range by adjusting the frequency of the radar system 100 when the current ambient temperature changes to a different temperature bin. The voltage bias method calibrates the range by adjusting the frequency of the radar system 100. One method of adjusting the frequency of a radar system is to adjust the voltage level of the RF source. This voltage adjustment should be made in accordance with the frequency deviation correction factor in the look-up table's temperature bin corresponding to the current ambient temperature. Other methods of adjusting the voltage of the RF source and thus changing the radar's frequency will be obvious to one of ordinary skill in the art.

After the system is allowed to reach a temperature steady state by waiting a pre-determined waiting period, the present method updates the look-up table's pre-set frequency deviation correction factors. The method can update the look-up table through any frequency deviation calibration technique such as the first or second calibration techniques described above. When the frequency calibration technique determines a qualified frequency deviation correction factor for the current ambient temperature, the frequency deviation correction factor value for the current temperature bin is replaced by the qualified frequency deviation correction factor. Concurrently, the radar system adjusts the frequency of the RF source using the ambient temperature sampling method as described above.

The present method preferably includes a microprocessor 11 having access to a memory. The method of the present invention preferably comprises software or firmware instructions executed by the microprocessor 11 (FIG. 8) or other data processing or sequencing device disposed within the radar system 100. In another alternative embodiment, the present range calibration method is "hardwired" into the radar system 100 and implemented using either discrete logic devices, large scale integrated (LSI) devices, very large scale integrated (VLSI) devices, or application specific integrated circuit (ASIC) devices.

In a preferred embodiment, the RF source is a Gunn diode and the look-up table contains twenty-eight bins, each bin ranging 5 degrees Celsius from −40 degrees to 95 degrees Celsius. However, a different number of bins and bin ranges can be used without departing from the scope of the present method. In one embodiment, at system initialization, the present voltage bias method initializes the look-up table with pre-set default values of frequency deviation correction factors corresponding to each of the twenty-eight temperature bins. These frequency deviation correction factors are variable and may be obtained through experimentation. The look-up table is preferably stored in memory. An exemplary look-up table is shown in FIG. 9. The actual entries to the look-up table shown in FIG. 9 are exemplary only, as they may change in actual use of the system. Alternatively, a customized look-up table using values that are manually entered may be used. In yet another alternative embodiment, a database that represents different Gunn diodes can be used.

After system initialization, the voltage bias method preferably samples the ambient temperature at a rate of once per minute. The rate of once per minute is exemplary and the present method can be accomplished using a different sampling rate. The present method calibrates the range by adjusting the frequency of the radar system 100 when the current ambient temperature changes to a different temperature bin. The voltage bias method calibrates the range by adjusting the voltage level of the Gunn Diode according to the frequency deviation correction factor in the look-up table's temperature bin that corresponds to the current ambient temperature. In a preferred embodiment, the present method adjusts the voltage level of the Gunn diode by adjusting the setting of a digital-to-analog converter (DAC) that controls the voltage level of the Gunn diode. However, other methods of adjusting the voltage level of an RF source of a radar system 100 will be obvious to one of ordinary skill in the art.

In a preferred embodiment, the pre-determined waiting period to allow the radar system 100 to reach a steady state temperature is 5 minutes. After this 5 minute waiting period the voltage bias implementation method of the present invention preferably adjusts the frequency of the Gunn diode when either the ambient temperature changes to a new temperature bin (as described above) or the current frequency deviation correction factor is updated by a calibration technique.

The voltage bias implementation method of the present invention preferably uses a microprocessor having access to memory or similar digital storage logic devices. Initially, the voltage bias method uses a look-up table with pre-set frequency deviation correction factor values corresponding to temperature bins. The voltage bias method updates the look-up table through a frequency calibration technique such as the second calibration technique described above. Whenever the voltage bias method senses an ambient temperature switching to a different temperature bin or a frequency deviation correction factor update, the system implements a hardware correction of the range by adjusting the voltage of the RF source. In an alternative embodiment, a mathematical correction implementation method can be used by simply using the look-up table's frequency deviation correction factors in the same manner as the voltage bias method, but correcting the range mathematically instead of varying the RF source's voltage.

In summary, the present invention includes a method and apparatus for calibrating range in a radar system. The present invention is particularly useful in automobiles, trucks, vans, or any other vehicle that travels on a road with other vehicles. The present invention reduces system size and costs by not requiring the use of additional equipment for range calibration purposes. The present invention advantageously uses relatively simple and straight-forward algorithms for calculating a frequency deviation correction factor. The calibration techniques described above may be used independently, or concurrently, to accurately calibrate the range of a radar system.

A number of embodiments of the present invention have been described. Nevertheless, it will be understood that various modifications may be made without departing from the spirit and scope of the invention. For example, the present invention may use any FCC-approved vehicle radar frequency and bandwidth. As described above, the present invention preferably uses a monopulse radar system using at least two transmitting frequencies. However, the present invention is not so limited. The invention contemplates use with any radar system that can determine range, range rate, and azimuth angle 19 of targets. For example, switched beam, frequency scanned, or mechanically scanned radar systems may be employed. In addition, the present invention may alternatively be used in a radar system.

Accordingly, it is to be understood that the invention is not to be limited by the specific illustrated embodiment, but only by the scope of the appended claims.

What is claimed is:

1. An apparatus for calibrating range in a radar system, comprising:
    a) a radar antenna wherein the antenna outputs a plurality of range values and a plurality of Doppler range rate values; and
    b) a microprocessor, operatively connected to the antenna, wherein a frequency deviation correction factor is generated by the microprocessor and the range of the radar system is calibrated according to the frequency deviation correction factor.

2. An apparatus for calibrating a range measurement in a radar system, comprising:
    a) selecting means for selecting a calibration target for use in calibrating a range measurement;
    b) initiating means, responsive to the selecting means, for obtaining an initial measurement of a target range and a Doppler range rate at a first time instance;
    c) measuring means, responsive to the selecting means, for obtaining subsequent measurements of the target range and the Doppler range rate at successive time instances subsequent to the first time instance;
    d) qualifying means, responsive to the measuring means, for qualifying the calibration target selected by the selecting means;
    e) calculating means, responsive to the qualifying means, for calculating a frequency deviation correction factor using the initial and subsequent target range and Doppler range rate measurements; and
    f) calibrating means, responsive to the calculating means, for calibrating the range to compensate for frequency deviation in the radar system.

3. A method of calibrating a range measurement in a radar system comprising an antenna and a computer, comprising the steps of:
    a) selecting a calibration target for use in calibrating the range measurement;
    b) obtaining an initial measurement of a target range and a Doppler range rate at a first time instance;
    c) obtaining subsequent measurements of the target range and the Doppler range rate at successive time instances subsequent to the first time instance;
    d) qualifying the calibration target;
    e) calculating a frequency deviation correction factor caused by a frequency deviation using the initial and subsequent target range and Doppler range rate measurements obtained at STEPS b) and c); and
    f) calibrating the range to compensate for the frequency deviation.

* * * * *